United States Patent

Fane

[19]

[11] Patent Number: 6,082,555
[45] Date of Patent: Jul. 4, 2000

[54] METHOD FOR STORING A PLURALITY OF ELECTRONIC SMART CARDS

[75] Inventor: Madjide Fane, Paris, France

[73] Assignee: Schlumberger Systemes, Paris, France

[21] Appl. No.: 09/051,024

[22] PCT Filed: Sep. 18, 1996

[86] PCT No.: PCT/FR96/01447

§ 371 Date: Mar. 31, 1998

§ 102(e) Date: Mar. 31, 1998

[87] PCT Pub. No.: WO97/11438

PCT Pub. Date: Mar. 27, 1997

[30] Foreign Application Priority Data

Sep. 19, 1995 [FR] France .................................. 95 11077

[51] Int. Cl.$^7$ ....................................................... A47F 5/00
[52] U.S. Cl. ............................. 211/50; 211/49.1; 206/215
[58] Field of Search ............................... 211/49.1, 50, 45; 206/561, 215; 271/185

[56] References Cited

U.S. PATENT DOCUMENTS

| 2,100,720 | 11/1937 | Page | 211/50 X |
| 3,946,879 | 3/1976 | Jensen | 271/185 X |
| 5,685,429 | 11/1997 | Myers | 211/50 X |
| 5,911,320 | 6/1999 | Forestelle | 206/215 |

*Primary Examiner*—Robert W. Gibson, Jr.
*Attorney, Agent, or Firm*—Frishauf, Holtz, Goodman, Langer & Chick, P.C.

[57] ABSTRACT

A method for storing a plurality of electronic smart cards each comprising a card body with a front surface and a rear surface, as well as an electronic module arranged in a recess in the front surface of the card body. The cards are stacked in series so as to be arranged in a number P of different directions such that the electronic module of a card having rank n is facing the rear surface of the card having rank n+P, while the front surface of the card having rank n and the rear surface of the card having rank n+P are separated by an air space with a thickness that is P−1 times that of the card body.

13 Claims, 1 Drawing Sheet

METHOD FOR STORING A PLURALITY OF ELECTRONIC SMART CARDS

FIELD OF THE INVENTION

The present invention concerns a method for storing a plurality of electronic smart cards.

BACKGROUND OF THE INVENTION

The invention can be applied advantageously for the production of electronic smart cards.

These cards are produced by a manufacturing method in which an electronic module, mainly formed of a semi-conductive chip disposed on a support fitted with electric contacts, is placed in a cavity arranged on the rear surface of a card body and fixed with a glue, such as a cyanoacrylate-based glue. The cards produced are generally stacked so that the rear surface of one of them is in contact with the rear surface of another.

However, a certain number of cards are altered when they are arranged in this way immediately after the operation for gluing the electronic module in the cavity of the card body. The alteration observed occurs on a portion of the front surface of each card placed against the rear surface bearing the electronic module of the adjacent card and, depending on the case, affects the transparent protective varnish of the card body, the transparent protective plastic film or the actual printed ink.

This alteration is supposed to result from degassing of the glue used and may extend for several days. This may occur without causing any ill effects when it concerns cards without any style of writing on the other side. On the other hand, the alteration is unacceptable when it concerns cards bearing on each of their surfaces a customized decoration conferring said cards with an improved aesthetic increment value.

The aim of the arrangement of cards via simple stacking is to facilitate a subsequent operation, such as handling, storage, shipment or an additional processing. With users in particular, the cards may undergo a customization operation, such as the marking or gluing of magnetic tracks. It is then necessary for the cards to be delivered in a regrouped form with one being placed against the other as they need to be submitted like this for processing.

One solution on altering of the cards, which would consist of changing either the varnish or protective film or the glue, is not desirable. In fact, the actual choice of each of these constituents already results from a best possible compromise concerning their respective properties and advantages: the glue as regards in particular its effectiveness, the varnish or protective film as regards a number of their properties, especially its capacity for electrostatic dispersion, hooking of the magnetic track and resistance to scratches.

A further solution able to avoid the deterioration of the cards could consist of deferring their storage for a certain period of time or storing them temporarily in a charger in which the cards would be kept separate from one another. However, these solutions are unsatisfactory as the period of degassing is relatively long and may last several days. In addition, they are incompatible with the delivery periods requiring large storage volumes and can result in a production stoppage.

Another drawback of resorting to using the charger is of impeding subsequent operations to the extent that the cards needed to be handled one by one so as to combine them for a serial processing. This subsequent processing may be carried out either in the plant or at the premises of the user. It includes all sorts of operations, such as packing into individual bags or user customization.

Also, the technical problem to be resolved by the present invention is to put forward a method for storing a plurality of electronic smart cards each comprising firstly a card body having one rear surface and one front surface, said method being able to avoid the drawbacks mentioned above by preventing the alteration of the smart cards in the production process and by facilitating subsequent operations.

SUMMARY OF THE INVENTION

According to the present invention, the solution to the technical problem put forward is achieved in that said method consists of stacking said cards consecutively according to P different orientations so that the electronic module of a card having rank n is placed opposite the front surface of the card having rank n+P, the rear surface of the card having rank n and the rear surface of the card having rank n+P being separated by an air space with a thickness equal to P−1 times the thickness of the card body.

Thus, none of the electronic modules is in contact with any rear surface of the plurality of the stored cards, which significantly limits the altering of the cards due to degassing of the glue of the electronic modules. The effect of altering shall be that much more reduced when the number P of orientations is high.

The cards are stored in batches in accordance with the method of the invention throughout the desired period until any degassing trace is eliminated. It is then extremely easy to place them in a suitable disposition for a subsequent operation, such as packing, by making the plurality of cards pivot so as to bring them into a perfect stacking position. This maneuver is a short operation and can be made manually for the entire pile.

So as to remove the vapors which form during glue degassing, the invention advantageously provides that a forced ventilation is produced in said air space separating the front surface of the card having rank n and the rear surface of the card having rank n+P.

BRIEF DESCRIPTION OF THE DRAWINGS

The following description with reference to the accompanying drawings given by way of non-restrictive examples shall fully reveal the details of the invention and how it can be embodied.

FIG. 1b is a side view of the stacking of FIG. 1a.

DETAILED DESCRIPTION OF THE PREFERRED EMBODIMENTS

Figure 1A:
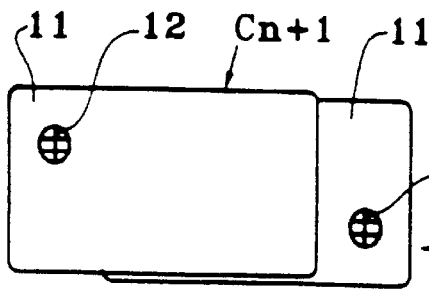
FIG. 1a is a top view of a first stacking of electronic smart cards stored in accordance with the method of the invention.
Figure 1B:
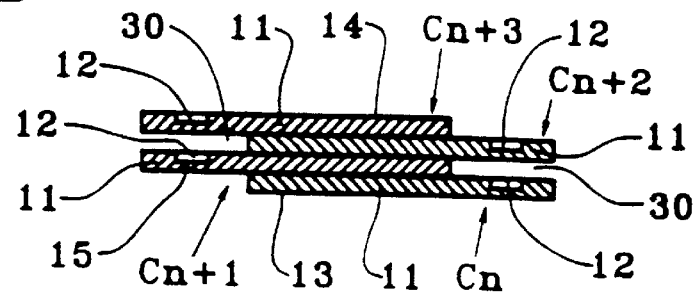

FIGS. 1a and 1b show a stacking a electronic smart cards Cn, Cn+1, etc., each comprising a card body 11 having one front surface 14 and one rear surface 13. Provided on the front face 14 is a cavity 15 in which an electronic module 12 is arranged and including a semiconductive microprocessor, EEPROM or chip, depending on the type of cards, connected to external electric contacts being flush with the front surface 14 of the card body 11.

The electronic module 12 is kept in the cavity 15 with the aid of a cryanoacrylate glue, for example.

So as to limit the harmful effects of degassing of the glue of the electronic module 12 on the surface of an adjacent card when the cards are merely superimposed on one another, FIGS. 1*a* and 1*b* show that it is an advantage to stack the cards consecutively according to two different orientations forming an angle of 180°. In this configuration, known as a 'top to bottom' configuration, the cards are parallel but in an opposing direction. More precisely, firstly the cards Cn, Cn+2, . . . , having rank n, n+2, . . . , and secondly Cn+1, Cn+3, . . . , having rank n+1, n+3 occupy an identical position in the pile so that the electronic module 12 of the card having rang n, for example, is placed opposite the rear surface 13 of the card having rank n+2, the front surface of the card having rank n and the rear surface of the card having rank n+2 being separated by an air space 30 having a thickness equal here to the thickness of the card body 11.

Figure 2:
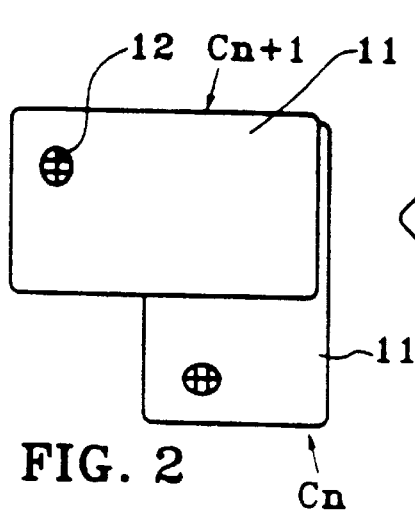
FIG. 2 is a top view of a second stacking of electronic smart cards stored in accordance with the method of the invention.

FIG. 2 shows the cards stacked in two different orientations forming an angle of 90°, two successive cards Cn and Cn+1 being perpendicular to each other in a bladed or fanned configuration. In this type of stacking, the air space separating the front surface of the card having rank n and the rear surface of the card having rank n+2 is equal to the thickness of the body 11 of the card, as for the stacking of FIGS. 1*a* and 1*b*.

Figure 3:
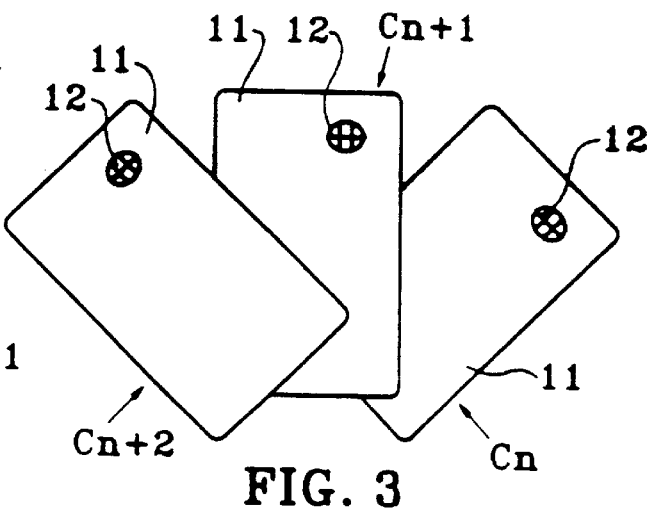
FIG. 3 is a top view of a third stacking of electronic smart cards stored in accordance with the method of the invention.

Of course, the number P of different orientations in which the cards are distributed successively is not limited to P=2. In the example shown on FIG. 3, the cards can assume P=3 different orientations in a fan-shaped disposition. In this case, the electronic module 12 of a card having rank n is placed opposite the rear surface of the card having rank n+3, the front surface of the card having rank n and the rear surface of the card having rank n+3 being separated by an air space with a thickness equal to 2 times the thickness of the body 11 of the card. This results in an increase of the thickness of said space which further facilitates degassing.

Figure 4:
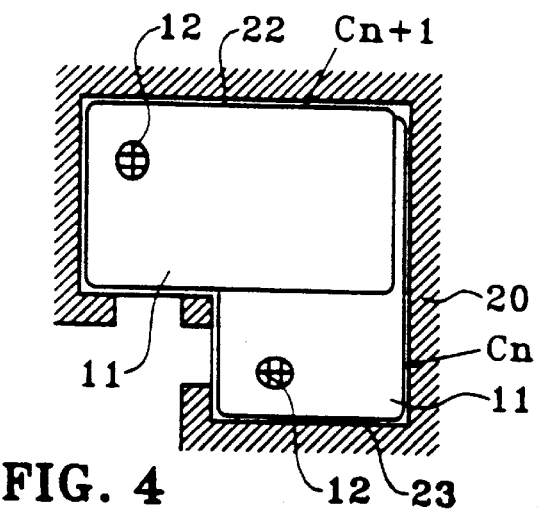
FIG. 4 is a top view of a container able to receive a stacking of cards conforming to FIG. 2.
Figure 5:
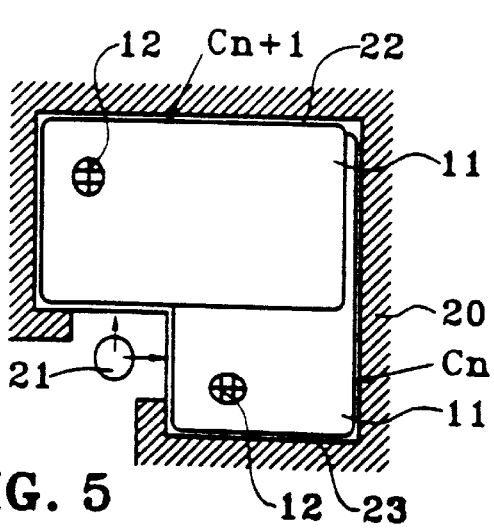
FIG. 5 is a top view of the container of FIG. 4 and fitted with a ventilation device.

As illustrated on FIGS. 4 and 5, the cards can be kept in a container placed at the outlet of the assembling machine and having P compartments corresponding to P different configurations 22, 23 for receiving the cards stacked according to the bladed configuration of FIG. 2.

Degassing can be accelerated by means of a forced ventilation produced in the air space separating the front surface of a card having rank n and the rear surface of the card having rank n+2 (generally, n+P) with the aid of ventilation nozzles shown on FIG. 5.

It can also be advantageous to store the piles of cards in a horizontal position. In fact, the degassing vapors therefore flow much easier to zones where they are no longer able to leave any trace, having regard to their density which differs from that of the air.

In conclusion, the advantages of the storage method of the invention are:

The risk of marks on degassing is virtually eliminated without involving any stress concerning the mode for producing the cards, the choice of materials (glue, varnish, etc.) or the production speed.

Degassing time may be as long as desired without causing unproductive equipment to stand idle or having excessive volumes.

The method does not involve any additional handling or any increase of storage or machine space.

The method can be used in subsequent production stages.

What is claimed is:

1. Method for storing a plurality of electronic smart cards each firstly comprising a card body having a front surface and a rear surface, and secondly an electronic module disposed in a cavity fitted on the front surface of said card body, wherein said method consists of stacking said cards consecutively according to P different orientations so that the electronic module of a card having rank n is placed opposite the rear surface of the card having rank n+P, the front surface of the card having rank n and the rear surface of the card having rank n+P being separated by an air space having a thickness equal to P−1 times the thickness of the card body.

2. Method according to claim 1, wherein the cards are stacked consecutively according to two (P=2) different orientations forming an angle of 90°.

3. Method according to claim 1, wherein the cards are stacked consecutively according to two (P=2) different orientations forming an angle of 180°.

4. Method according to claim 1, wherein the cards are stacked consecutively according to three (P=3) different orientations.

5. Method according to claim 1, wherein said cards are kept in a container having P compartments corresponding to the P different orientations of the cards.

6. Method according to claim 1, wherein a forced ventilation is produced in the air space separating the front surface of the card having rank n and the rear surface of the card having rank n+P.

7. Method according to claim 2, wherein said cards are kept in a container having P compartments corresponding to the P different orientations of the cards.

8. Method according to claim 3, wherein said cards are kept in a container having P compartments corresponding to the P different orientations of the cards.

9. Method according to claim 4, wherein said cards are kept in a container having P compartments corresponding to the P different orientations of the cards.

10. Method according to claim 2, wherein a forced ventilation is produced in the air space separating the front surface of the card having rank n and the rear surface of the card having rank n+P.

11. Method according to claim 3, wherein a forced ventilation is produced in the air space separating the front surface of the card having rank n and the rear surface of the card having rank n+P.

12. Method according to claim 4, wherein a forced ventilation is produced in the air space separating the front surface of the card having rank n and the rear surface of the card having rank n+P.

13. Method according to claim 5, wherein a forced ventilation is produced in the air space separating the front surface of the card having rank n and the rear surface of the card having rank n+P.

* * * * *